United States Patent
Wiinikka

(10) Patent No.: US 9,731,819 B2
(45) Date of Patent: Aug. 15, 2017

(54) SYSTEM AND METHOD FOR LINKAGE LENGTH ADJUSTMENT

(71) Applicant: Bell Helicopter Textron Inc., Fort Worth, TX (US)

(72) Inventor: Mark A. Wiinikka, Hurst, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 654 days.

(21) Appl. No.: 14/136,814

(22) Filed: Dec. 20, 2013

(65) Prior Publication Data

US 2014/0178199 A1    Jun. 26, 2014

Related U.S. Application Data

(60) Provisional application No. 61/745,255, filed on Dec. 21, 2012.

(51) Int. Cl.

| | |
|---|---|
| *F01D 1/00* | (2006.01) |
| *B64C 27/51* | (2006.01) |
| *B64C 27/00* | (2006.01) |
| *B64C 27/32* | (2006.01) |
| *F16C 11/06* | (2006.01) |

(52) U.S. Cl.
CPC ............ *B64C 27/51* (2013.01); *B64C 27/008* (2013.01); *B64C 27/32* (2013.01); *F16C 11/0614* (2013.01)

(58) Field of Classification Search
CPC ....... F03D 7/0224; F03D 7/042; Y02E 10/721
USPC .......................................................... 416/1
See application file for complete search history.

(56) References Cited

U.S. PATENT DOCUMENTS

| | | | |
|---|---|---|---|
| 2,952,501 A | * | 9/1960 | Lockery ................... G01D 9/28 346/139 R |
| 3,591,310 A | * | 7/1971 | Mouille ................... B64C 27/51 416/107 |
| 3,736,010 A | | 5/1973 | Larkin |
| 4,028,000 A | | 6/1977 | Weiland et al. |
| 5,431,540 A | | 7/1995 | Doolin et al. |
| 5,511,944 A | | 4/1996 | Ide et al. |

FOREIGN PATENT DOCUMENTS

WO       2012/148389       11/2012

OTHER PUBLICATIONS

International Preliminary Report on Patentability in PCT Application No. PCT/WO2013/077071 mailed on Mar. 10, 2015, 8 pages.
Written Opinion of the International Preliminary Examining Authority issued in International Application No. PCT/US2013/077071 on Nov. 7, 2014; 7 pages.
International Search Report and Written Opinion in PCT Application No. PCT/WO2013/077071 mailed on Apr. 3, 2014, 13 pages.

* cited by examiner

*Primary Examiner* — Craig Kim
*Assistant Examiner* — Jason Mikus

(57) ABSTRACT

A rotor system has a rotor, an axis of rotation about which the rotor may be rotated, a linkage system having a first adjustable length portion and a second adjustable length portion, wherein the second adjustable length portion is configured to provide a relatively finer adjustment of an overall effective length of the linkage system as compared to the first adjustable length portion and wherein the rotor is configured to rotate about the axis in response to changing the overall effective length of the linkage system.

16 Claims, 8 Drawing Sheets

SYSTEM AND METHOD FOR LINKAGE LENGTH ADJUSTMENT

CROSS-REFERENCE TO RELATED APPLICATIONS

The present application claims priority to U.S. Provisional Patent Application No. 61/745,255 filed Dec. 21, 2012 by Mark A. Wiinikka and entitled "System and Method for Linkage Length Adjustment," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some mechanical linkage systems comprise a control tube or linkage attached at least at one end to an adjustment device that may adjust an overall length of the mechanical linkage system. In some cases, a mechanical linkage system may comprise a turnbuckle system in which a control tube or linkage is connected at two ends between threaded or otherwise adjustable connectors so that rotation of the control tube or linkage relative to one or more of the connectors results in a change in overall length of the mechanical linkage system and/or a compressive or tensile force associated with the mechanical linkage system.

SUMMARY

In some embodiments of the disclosure, a rotor system is disclosed as comprising a rotor, an axis of rotation about which the rotor may be rotated, a linkage system, comprising a first adjustable length portion and a second adjustable length portion, wherein the second adjustable length portion is configured to provide a relatively finer adjustment of an overall effective length of the linkage system as compared to the first adjustable length portion and wherein the rotor is configured to rotate about the axis in response to changing the overall effective length of the linkage system.

In other embodiments of the disclosure, a method of adjusting a rotational position of a rotor relative to an axis of rotation is disclosed as comprising linking a first rotor system component to a second rotor system component via a linkage system comprising a variable overall effective length, and while maintaining the link between the first rotor system component and the second rotor system component via the linkage system, adjusting the overall effective length of the linkage system by at least one of adjusting a first adjustable length portion and adjusting a second adjustable length portion, wherein the second adjustable length portion is configured to provide a relatively finer adjustment of an overall effective length of the linkage system as compared to the first adjustable length portion.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a mechanical linkage system comprising an adjustable overall length that may be adjusted without fully disassembling the mechanical linkage system and/or without rotating a primary control tube or linkage about a lengthwise or longitudinal axis of the primary control tube or linkage. In some cases where a primary control tube or linkage comprises a damper, it may be desirable to allow an overall length adjustment that is infinitely variable without significantly rotating the damper. For example, it may be desirable to adjust an overall length of a linkage system comprising a damper without significantly disturbing an orientation of the damper and/or grounding straps, internal compensating devices and/or sight glass devices that are associated with the damper and may functionally depend on the damper being oriented in a particular manner. In some cases, the above-described damper may be a damper of a rotor system, such as a helicopter rotor system.

Figure 1:
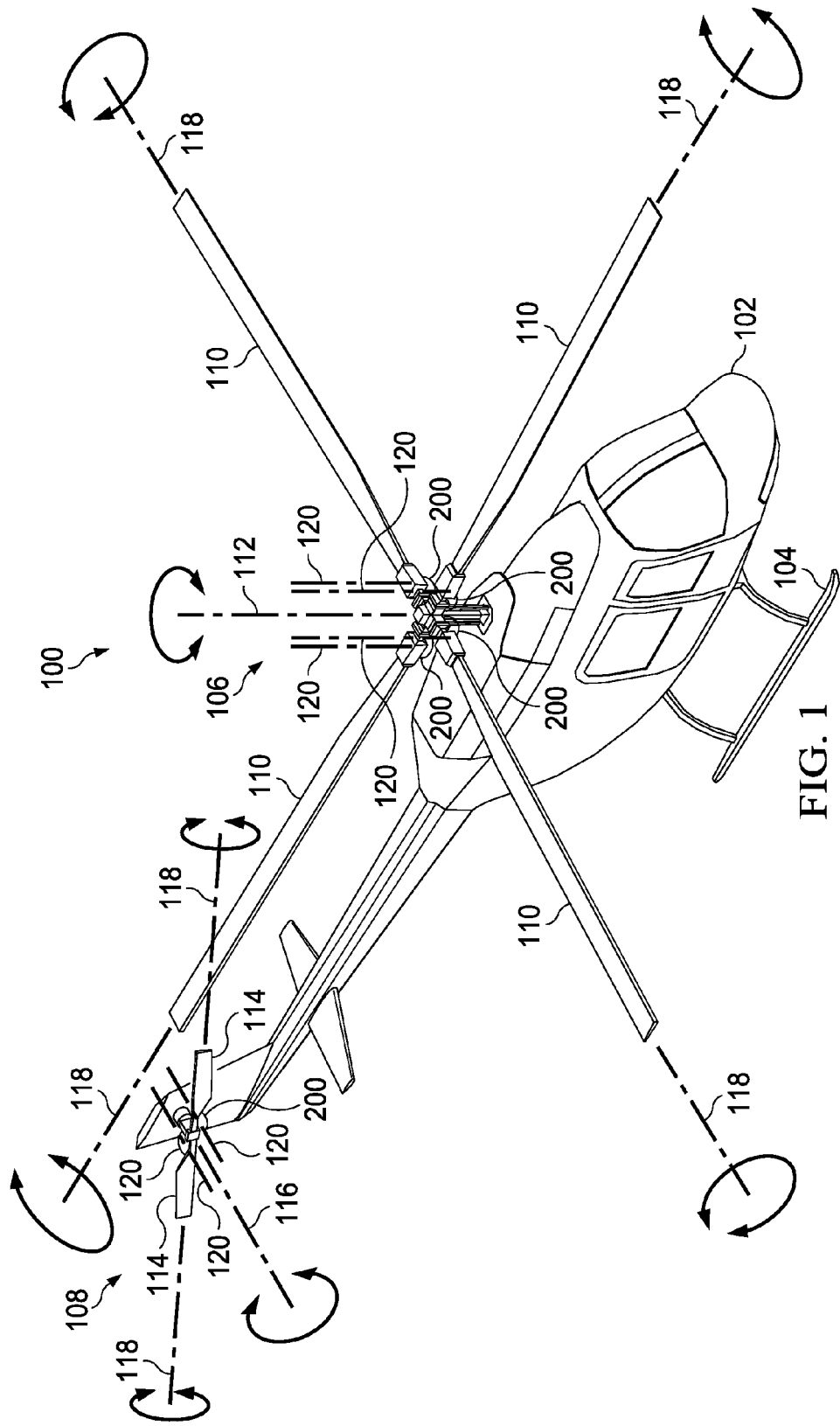
FIG. 1 is an oblique view of a helicopter according to an embodiment of the disclosure.
Figure 2:
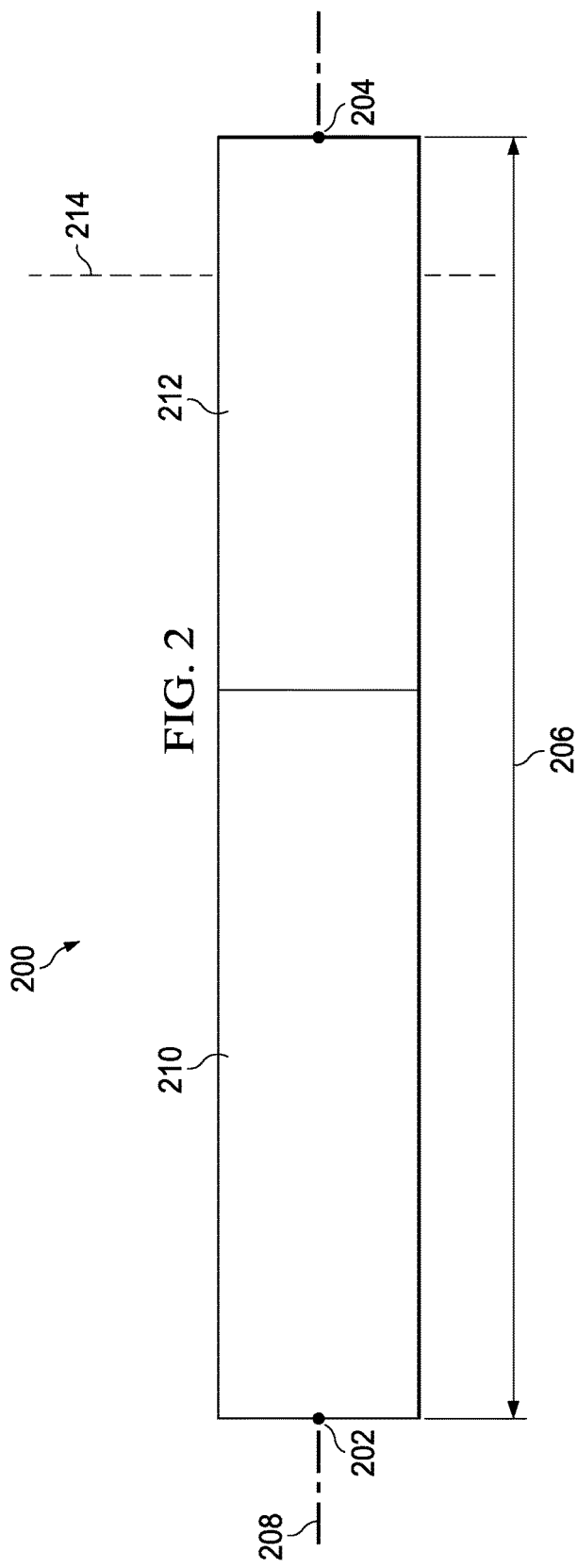
FIG. 2 is a schematic orthogonal side view of a linkage system of the helicopter of FIG. 1.

Most generally, FIGS. 1 and 2 and the related discussion disclose systems and methods that provide rotor systems, such as main rotor assemblies and tail rotor assemblies, that comprise variable length linkage systems for affecting a position of the rotors of the rotor systems. FIGS. 1 and 2 and the related discussion primarily focus on the kinematic features of the linkage systems which may be present regardless of what components of the rotor systems the linkage systems may be employed to link together. It will be appreciated that the kinematic features of the linkage systems of FIG. 2 may be, in a variety of embodiments, enabled through the use of various mechanical components. Particularly, adjustable length portions of the linkage system may comprise one or more adjustable length components, such as, but not limited to, threaded components, turnbuckle systems, geared systems, eccentric components, cam components, and/or any other suitable sufficiently rigid adjustable length components and/or mechanisms. It will further be appreciated that while the linkage systems of FIG. 2 may be described as comprising two adjustable length portions, it will be appreciated that each of the adjustable length portions may, in some embodiments, comprise a plurality of components including at least one adjustable length component. While FIG. 2 generally discloses a kinematic groundwork for a variety of linkage systems, FIGS. 3-8 and the related discussion are relatively more focused on disclosing a particular embodiment of a rotor system comprising a linkage system that shares at least some of the kinematic features of the linkage systems of FIG. 2. In some embodiments, the linkage system of FIGS. 3-8 may be employed as and/or in place of the linkage systems of FIGS. 1 and 2.

Referring now to FIG. 1, an oblique view of a helicopter 100 is shown. The helicopter 100 generally comprises a fuselage 102, landing gear 104, a main rotor assembly 106, and a tail rotor assembly 108. The main rotor assembly 106 is generally configured to selectively rotate main rotor blades 110 about an axis of rotation 112. The tail rotor assembly 108 is generally configured to selectively rotate tail rotor blades 114 about an axis of rotation 116. Each rotor blade 110,114 is configured to selectively rotate about a pitch axis 118 and is configured to allow lead-lag rotation about a lead-lag axis 120. In some embodiments, the pitch axis 118 and the lead-lag axis 120 of a rotor blade 110, 114 are substantially orthogonal to each other. In this embodiment, the lead-lag rotation of the rotor blades 110,114 about the lead-lag axes 120 are limited and/or affected by a linkage system 200 according to the disclosure.

Referring now to FIG. 2, a schematic orthogonal side view of a linkage system 200 is shown. The linkage system 200 comprises a first linkage system end 202 and a second linkage system end 204. The linkage system 200 comprises a variable overall effective length 206 that is measured between the first linkage system end 202 and the second linkage system end 204 along a lengthwise axis 208. The linkage system 200 further comprises a first adjustable length portion 210 and a second adjustable length portion 212. The overall effective length 206 may be adjusted by varying an effective length of at least one of the first adjustable length portion 210 and the second adjustable length portion 212. In some embodiments, an effective length of the first adjustable length portion 210 along the lengthwise axis 208 may be varied in response to rotation of a component of the first adjustable length portion 210.

In this embodiment, a component of the first adjustable length portion 210 may be rotated about the lengthwise axis 208 to selectively alter an effective length of the first adjustable length portion 210. The above-described rotation of the component of the first adjustable length portion may generally alter the effective length of the first adjustable length portion 210 according to a first relationship between an amount of angular displacement about the lengthwise axis 208 and an amount of change in effective length of the first adjustable length portion 210. In some embodiments, such as when the rotated component comprises a screw with constant thread pitch, the first relationship may be substantially linear so that a desired amount of change in length can be obtained by rotating the component by a known corresponding amount of angular displacement about the lengthwise axis 208.

In this embodiment, a component of the second adjustable length portion 212 may be rotated about an incident axis 214 to selectively alter an effective length of the second adjustable length portion 212. In this embodiment, the incident axis 214 intersects and is orthogonal to the lengthwise axis 208. The above-described rotation of the component of the second adjustable length portion may generally alter the effective length of the second adjustable length portion 212 according to a second relationship between an amount of angular displacement about incident axis 214 and an amount of change in effective length of the second adjustable length portion 212. In some embodiments, such as when the rotated component comprises an eccentric profile, a cam, and/or an irregular profile, the second relationship may comprise substantially linear, partially linear, non-linear, partially non-linear characteristics with regard to a the amount of change in length obtained in response to rotating the component by a known corresponding amount of angular displacement about the incident axis 214. Further, the amount of change in length obtained in response to rotating the component by a known corresponding amount may additionally depend on an absolute angular orientation of the component relative to another component of the second adjustable length portion 212. In some embodiments, such as when the rotated component comprises an eccentric profile, the second relationship may be substantially linear so that a desired amount of change in length can be obtained by rotating the component by a known corresponding amount of angular displacement about the incident axis 214.

In this embodiment, the first relationship may comprise a first ratio and the second relationship may comprise a second ratio. The second ratio may be less than the first ratio so that the first adjustable length portion 210 provides a relatively coarser adjustment as compared to a relatively finer adjustment of the second adjustable length portion 212. In some embodiments, a resolution and/or sensitivity of the second adjustable length portion 212 may be twice the resolution and/or sensitivity of the first adjustable length portion 210 so that the number of degrees of rotation required to obtain a desired change in the overall effective length 206 using the second adjustable length portion 212 is two times the number of degrees of rotation required to obtain the desired change in the overall effective length 206 using the first adjustable length portion 210. In this embodiment, each of the first adjustable length portion 210 and the second adjustable length portion 212 are infinitely variable. However, in alternative embodiments, one or both of the first adjustable length portion 210 and the second adjustable length portion 212 may be incrementally variable so that only prescribed amounts of rotation are allowed. In this embodiment, the linkage system 200 allows both course and fine adjustment of the overall effective length 206 without requiring a disconnection between the first linkage system end 202 and the second linkage system end 204. While the first adjustable length portion 210 and the second adjustable length portion 212 are shown as being directly connected to each other and forming the entire linkage between the first linkage system end 202 and the second linkage system end 204, in alternative embodiments, additional adjustable length portions and/or static length portions may provide a portion of the overall effective length 206. In operation, changing the overall effective length 206 may rotate a rotor blade about a lead-lag axis 120. In some embodiments, the linkage system 200 may comprise a lead-lag damper. Accordingly, in cases where a lead-lag damper of a linkage system 200 undergoes a change in overall effective length, one or both of the first adjustable length portion 210 and the second adjustable length portion 212 may be adjusted to maintain a desired overall effective length 206. In alternative embodiments, a linkage system substantially similar to linkage system 200 may be utilized in a pitch adjustment system associated with a rotor blade 110, 114. Accordingly, an overall effective length of a linkage system substantially similar to linkage system 200 may be utilized to adjust an amount of rotation and/or a position of a rotor blade 110, 114 about a pitch change axis 118. More generally, a linkage system substantially similar to linkage system 200 may be advantageously utilized in any mechanical device and/or vehicle to carefully control an overall effective length of a linkage system without disconnecting the components joined by the ends of the linkage system.

Figure 3:
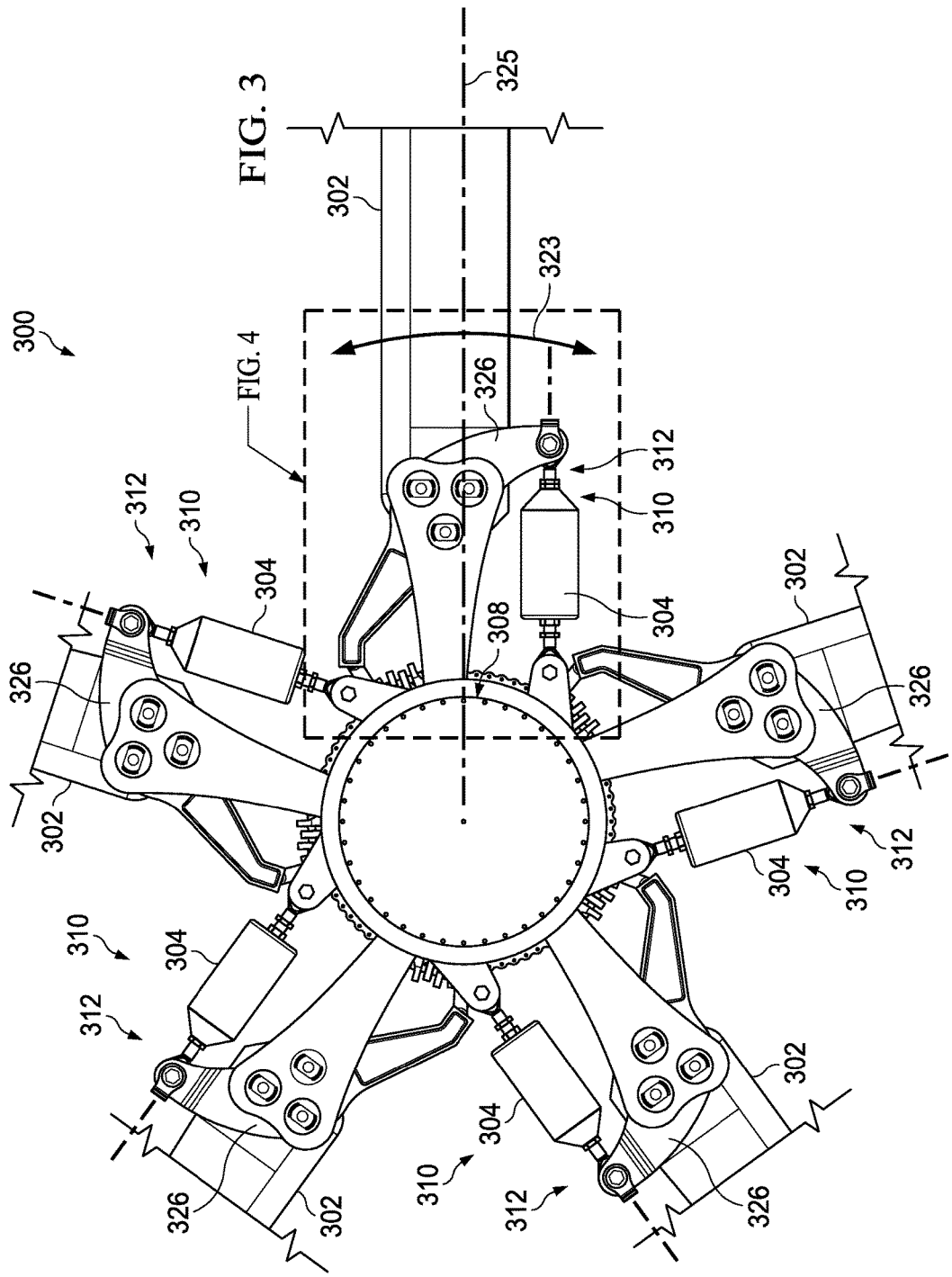
FIG. 3 is an orthogonal top view of a rotor system according to an embodiment of the disclosure.
Figure 4:
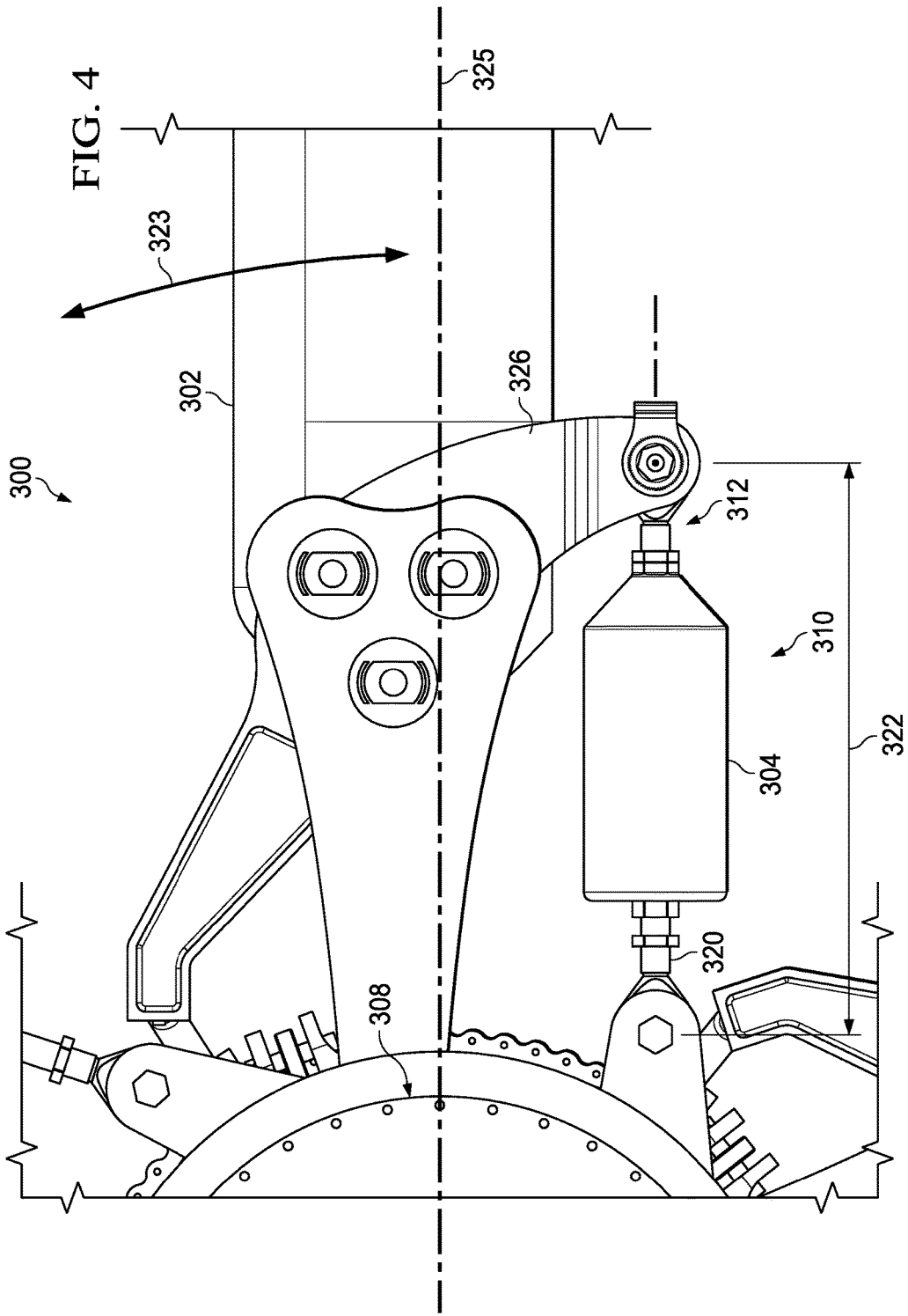
FIG. 4 is an orthogonal top view of a damper linkage system of the rotor system of FIG. 3.
Figure 5:
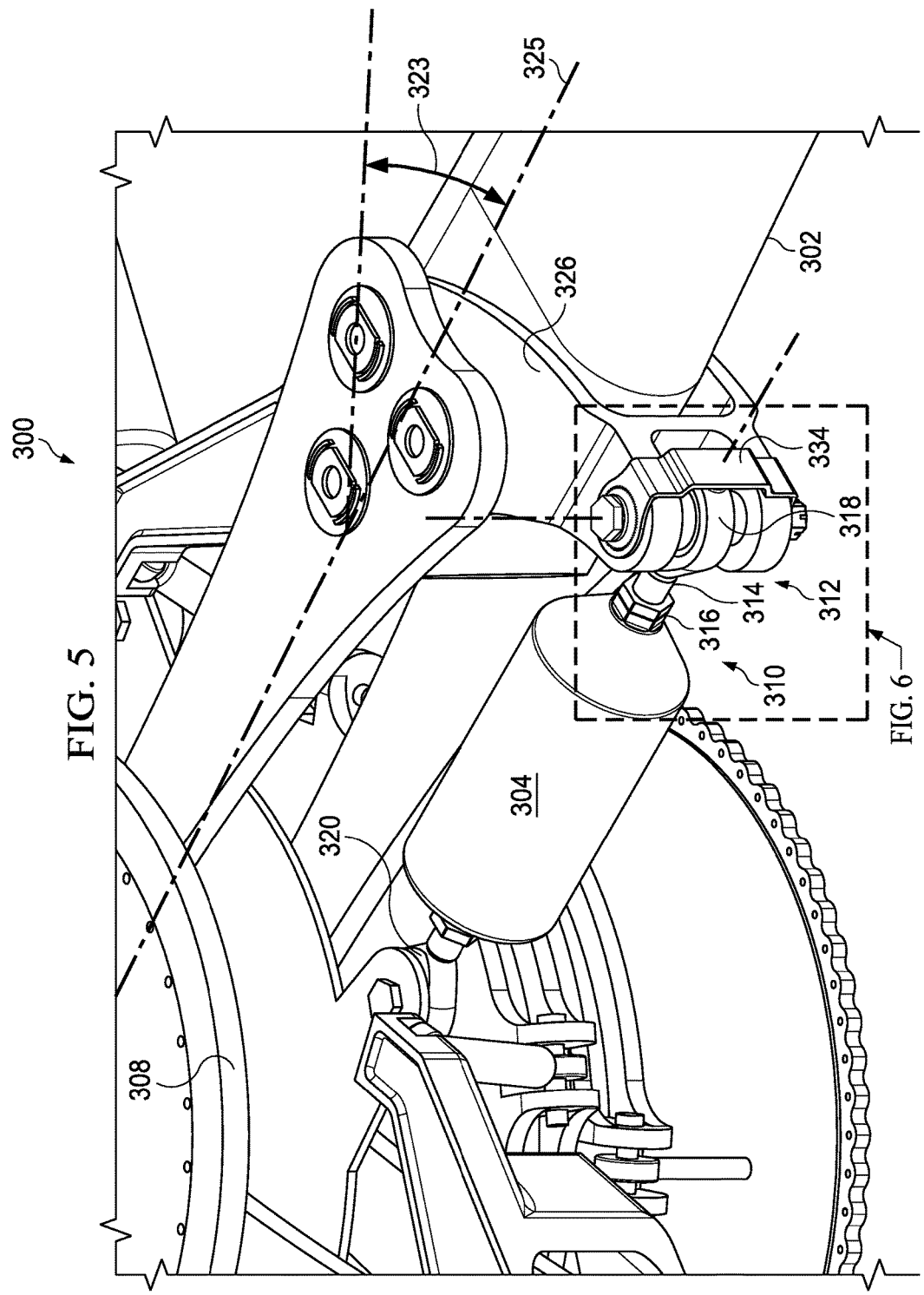
FIG. 5 is a close-up oblique top-right-front view of the damper linkage system of FIG. 4.

Referring now to FIGS. 3-5, an orthogonal top view of a rotor system 300, an orthogonal top view of a damper linkage system 310 of the rotor system 300, and a close-up oblique top-right-front view of the damper linkage system 310, according to an embodiment of the disclosure are shown, respectively. The rotor system 300 may comprise articulated rotors 302 that utilize elastomeric and/or fluid/elastic lead-lag dampers 304. In some cases, the articulated rotors 302 may be adjusted to change a sweep of the articulated rotors 302 to selectively align individual articulated rotors 302 relative to each other and/or to balance a rotor hub 308. The rotor system 300 comprises damper linkage systems 310, in some cases, configured to allow both coarse and fine adjustment of the damper linkage systems 310 through the use of adjustment systems 312. The adjustment systems 312 may comprise a connector 314 comprising a generally eye-bolt shape so that a threaded rod end 316 is connected to a generally annular wall 318. The damper linkage systems 310 may further comprise a hub connector 320 that selectively joins the dampers 304 to the rotor hub 308 or other structural components carried by the rotor hub 308. In some cases, the hub connector 320 may be configured to allow length adjustments of the damper linkage systems 310. In some embodiments, the hub connector 320 may be substantially similar to connector 314. In some embodiments, adjustment of an overall effective length 322 of the damper linkage system 310 may cause a change in a sweep angle 323 relative to a centerline 325 extending from an axis of rotation 327 of the rotor hub 308. In some cases, lengthening the overall effective length 322 may cause a tip of the rotor 302 to move generally angularly in a first direction relative to the rotor hub 308 as viewed from above while shortening the overall effective length 322 may cause a tip of the rotor 302 to move generally angularly in a second direction opposite the first direction relative to the rotor hub 308 as viewed from above. In some embodiments, the overall effective length 322 may be measured between axes of rotation associated with connector 314 and hub connector 320 as viewed from above.

Figure 6:
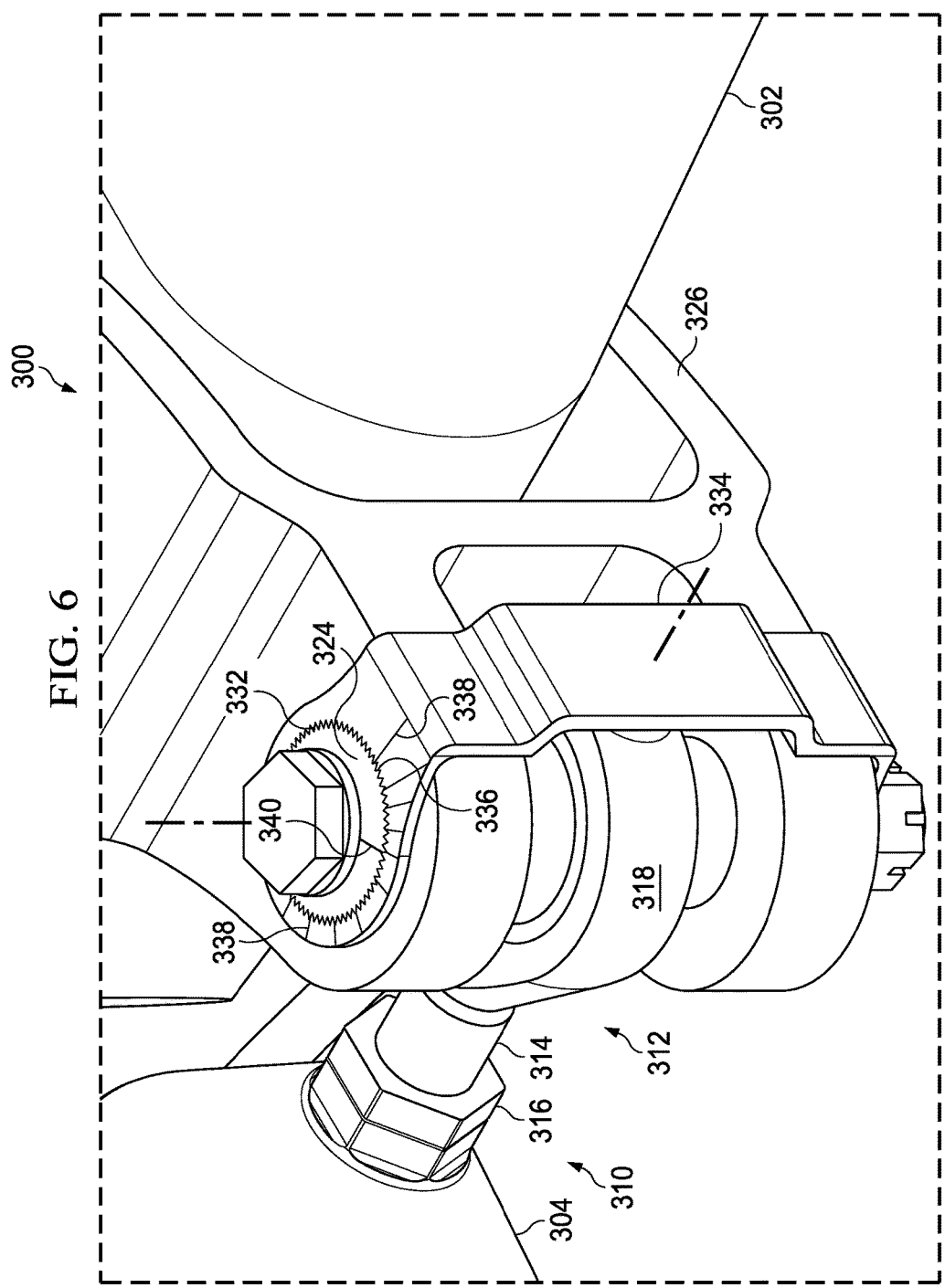
FIG. 6 is a close-up oblique top-right-front view of an adjustment system, in an assembled state, of the damper linkage system of FIG. 5.
Figure 7:
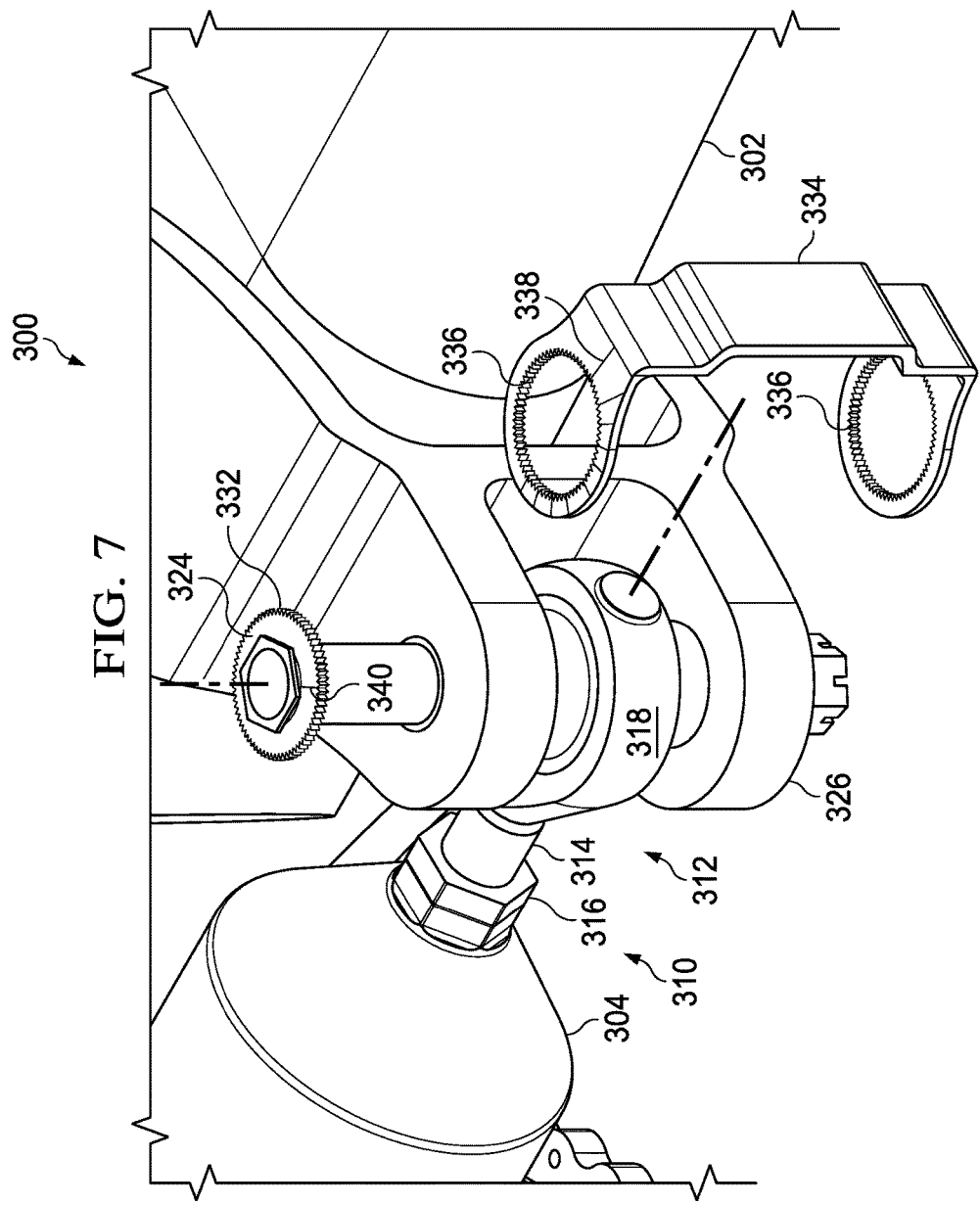
FIG. 7 is a close-up oblique top-right-front view of the adjustment system of FIG. 5 in a partially disassembled state.
Figure 8:
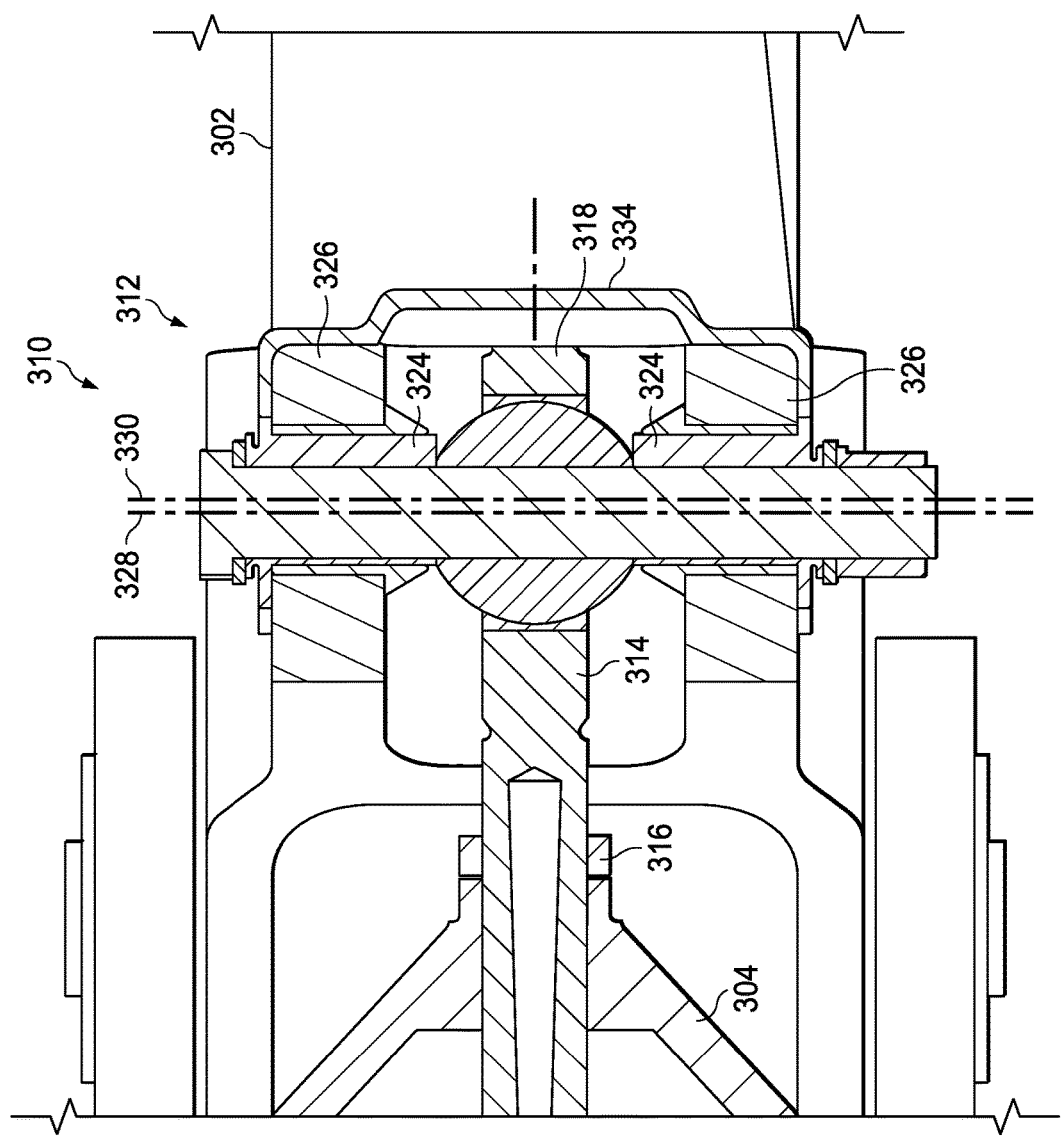
FIG. 8 is an orthogonal cross-sectional top view of the adjustment system of FIG. 5.

Referring now to FIGS. 6-8, a close-up oblique top-right-front view of an adjustment system 312 in an assembled state, a close-up oblique top-right-front view of an adjustment system 312 in a partially disassembled state, and an orthogonal cross-sectional top view of an adjustment system 312 are shown, respectively. Adjustment system 312 may comprise an eccentric bushing 324 carried by a pitch horn 326 connected to the rotor 302. The eccentric bushing 324 may comprise a bushing central axis 328 about which the eccentric bushing 324 may be rotated and a bolt hole axis 330 that is generally parallel to but offset from the bushing central axis 328 so that rotation of the eccentric bushing 324 about the bushing central axis 328 causes the bolt hole axis 330 to angularly rotate about the bushing central axis 328. By rotating the eccentric bushing 324 about the bushing central axis 328, a fine adjustment in the overall effective length 322 may be made. Larger adjustments to the effective overall length 322 may be made by rotating the connector 314 relative to the damper 304.

Adjustment system 312 may further provide an indexing functionality by providing location teeth 332 on a head of the eccentric bushing 324 and by providing an index bracket 334 comprising complementary teeth 336 formed in an aperture of the index bracket 334 that is configured to receive the head of the eccentric bushing 324. Because the index bracket 334 may maintain a constant spatial relationship relative to the pitch horn 326 when installed, bracket markings 338 may be provided on the index bracket 334 and bushing markings 340 may be provided on the eccentric bushing 324 to provide a frame of reference for monitoring, recording, and/or reliably adjusting a rotation of the eccentric bushing 324 relative to the pitch horn 326, and in turn, monitoring, recording, and/or reliably adjusting the overall effective length 322.

The connector 314 can generally provide one half turn course adjustments while the eccentricity of the eccentric bushing 324 may be equal to about one quarter the pitch of the thread of the connector 314. Increasing or decreasing the pitch of the indexing spline formed by the teeth 332, 336 may increase or decrease a fidelity of length adjustment. Removal of the damper 304 is not required to adjust the overall effective length 322. Accordingly, adverse effects on features internal to the damper 304 are minimized and flight test instrumentation may remain intact during adjustment to the overall effective length 322. The adjustment of the eccentric bushing 324 may be mechanized through the use of engaging/disengaging components and a motor or the like. In some embodiments, a method of adjusting an overall effective length 322 of a damper linkage system 310 may comprise leaving a damper 304 attached to an aircraft and selectively adjusting an overall effective length 322 with course and/or fine and/or infinitely variable length adjustments.

In one example embodiment of an adjustment system 312, upper and lower eccentric bushings 324 may be provided with a 0.021 inch eccentricity to allow 0.042 inches of total adjustment range to substantially equal the adjustment selectively available by turning the connector 314 by one half turn. In some embodiments, a 54 tooth indexing spline may allow adjustments in 0.002 inch length increments. Of course, in alternative embodiments, any other desirable resolution of teeth, amounts of eccentricity, thread pitch on connectors 314, and indicators for monitoring changes in length may be provided. In alternative embodiments, the connector 314 may comprise 12 threads per inch and a 180 degree rotation of the connector 314 may cause a 1.4 inch change in a lead-lag position of the rotor 302 tip.

It will be appreciated that, in some embodiments, dampers 304 and/or connectors 314 may form a portion of the first adjustable length portion 210 and the eccentric bushing 324 and related components may form a portion of the second adjustable length portion 212.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A rotor system, comprising:
  a rotor;
  an axis of rotation about which the rotor may be rotated;
  a linkage system having an overall effective length, comprising:
    a first adjustable length portion comprising a threaded component having a lengthwise axis in which the overall effective length is measured;
    a second adjustable length portion connected to the first adjustable length portion, the second adjustable length portion comprising an eccentric bushing carried by a pitch horn connected to the rotor, the eccentric bushing having a bushing central axis that is substantially orthogonal to the lengthwise axis, wherein the second adjustable length portion adjusts the overall effective length of the linkage system by rotating the eccentric bushing about the bushing central axis;
    wherein the second adjustable length portion is configured to provide a relatively finer adjustment of the overall effective length of the linkage system as compared to the first adjustable length portion; and
  wherein the rotor is configured to rotate about the axis in response to changing the overall effective length of the linkage system.

2. The rotor system of claim 1, wherein the axis comprises a lead-lag axis.

3. The rotor system of claim 1, wherein the linkage system comprises an elastomeric damper.

4. The rotor system of claim 3, wherein the elastomeric damper comprises a lead-lag damper.

5. The rotor system of claim 1, wherein the axis comprises a pitch change axis.

6. The rotor system of claim 1, wherein the linkage system comprises a pitch link.

7. The rotor system of claim 1, wherein each of the first adjustable length portion and the second adjustable length portion are adjustable while maintaining a link between a first rotor system component from a second rotor system component via the linkage system.

8. The rotor system of claim 1, wherein the first adjustable length portion is adjusted by rotating about the lengthwise axis.

9. A method of adjusting a rotational position of a rotor relative to an axis of rotation, comprising:
  linking a first rotor system component to a second rotor system component via a linkage system having a variable overall effective length, the linkage system comprising a first adjustable length portion comprising a threaded component having a lengthwise axis and a second adjustable length portion connected to the first adjustable length portion, the second adjustable length portion comprising an eccentric bushing carried by a pitch horn connected to the rotor, the eccentric bushing having a bushing central axis that is substantially orthogonal to the lengthwise axis; and
  while maintaining the link between the first rotor system component and the second rotor system component via the linkage system, adjusting the overall effective length of the linkage system by at least one of adjusting the first adjustable length portion by rotating the threaded component and adjusting the second adjustable length portion by rotating the eccentric bushing about the bushing central axis, wherein the second adjustable length portion is configured to provide a relatively finer adjustment of an overall effective length of the linkage system as compared to the first adjustable length portion.

10. The method of claim 9, wherein a lead-lag position of the rotor is changed as a function of the adjusting the overall effective length of the linkage system.

11. The method of claim 9, wherein a pitch of the rotor is changed as a function of the adjusting the overall effective length of the linkage system.

12. The method of claim 9, wherein the threaded component is rotated about the lengthwise axis.

13. The rotor system of claim 1, wherein the eccentric component comprises:
  the eccentric bushing having a head and a plurality of location teeth on the head;
  an index bracket having a plurality of complementary teeth formed in an aperture of the index bracket that is configured to receive the head of the eccentric bushing.

14. The rotor system of claim 13, further comprising a set of bracket markings on the index bracket and a set of bushing markings on the eccentric bushing that provide a frame of reference for monitoring, recording, and/or reliably adjusting a rotation of the eccentric bushing.

15. The method of claim 9, wherein the eccentric component comprises:
  the eccentric bushing having a head and a plurality of location teeth on the head;
  an index bracket having a plurality of complementary teeth formed in an aperture of the index bracket that is configured to receive the head of the eccentric bushing.

16. The method of claim 15, further comprising a set of bracket markings on the index bracket and a set of bushing markings on the eccentric bushing that provide a frame of reference for monitoring, recording, and/or reliably adjusting a rotation of the eccentric bushing.

* * * * *